Nov. 18, 1924.  
T. E. BURNER  
1,515,654  
GRINDING MILL  
Filed Feb. 28, 1923   2 Sheets-Sheet 1

Witness:

Inventor:
Thomas E. Burner
by Frank L. Belknap, Atty.

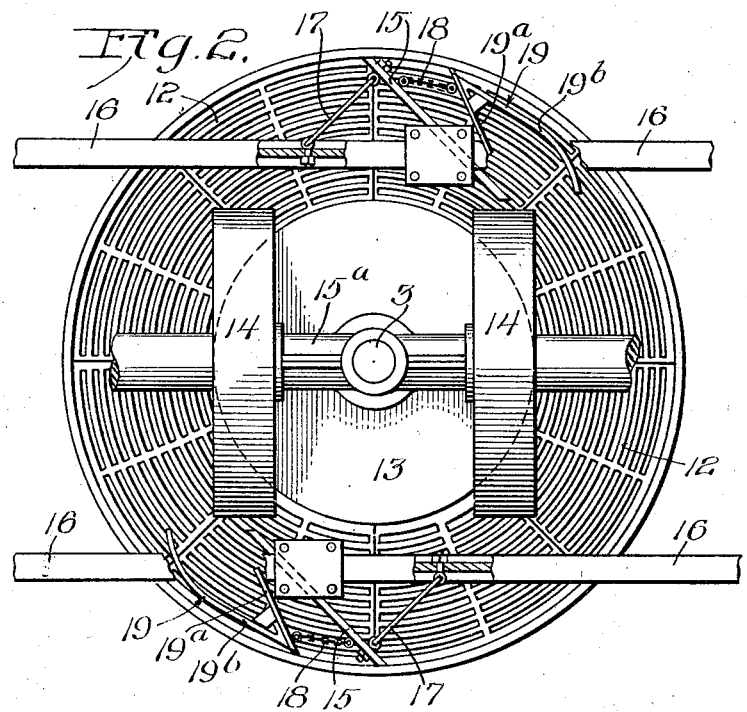
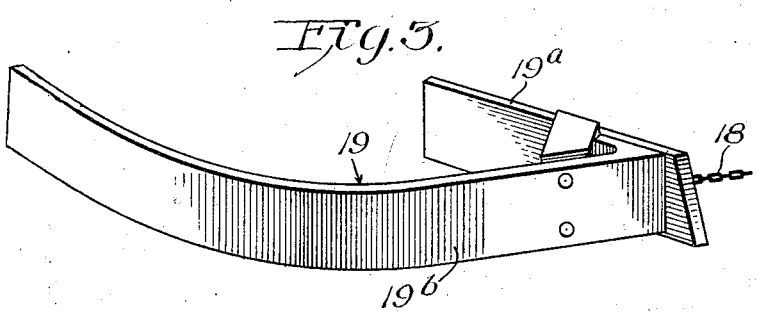

Patented Nov. 18, 1924.

1,515,654

UNITED STATES PATENT OFFICE.

THOMAS E. BURNER, OF CARTHAGE, ILLINOIS.

GRINDING MILL.

Application filed February 28, 1923. Serial No. 621,715.

*To all whom it may concern:*

Be it known that I, THOMAS E. BURNER, a citizen of the United States, residing in the city of Carthage, county of Hancock, and State of Illinois, have invented certain new and useful Improvements in Grinding Mills, of which the following is a specification.

This invention relates to improvements in a grinding or chasing mill or machine commonly known as a "dry pan" and refers more particularly to a device positioned in the pan to facilitate the discharge of the pulverized material and to prevent clogging of the machine.

Among the salient objects of the invention are to provide a mechanism having a substantially free or floating shear or scraper adjustably positioned in the bottom of the "dry pan" above the screen plates or grates for clearing the openings, of ground material which tends to clog the machine and prevent the passage of pulverized material therethrough; to provide a device which is relatively cheap in construction, easily detached and one that is admirably adapted to the purpose for which it is intended.

Fig. 2 is a plan view showing the grates and muller wheels with parts omitted.

Fig. 3 is a perspective detail of the shear or scraper.

Figure 1:
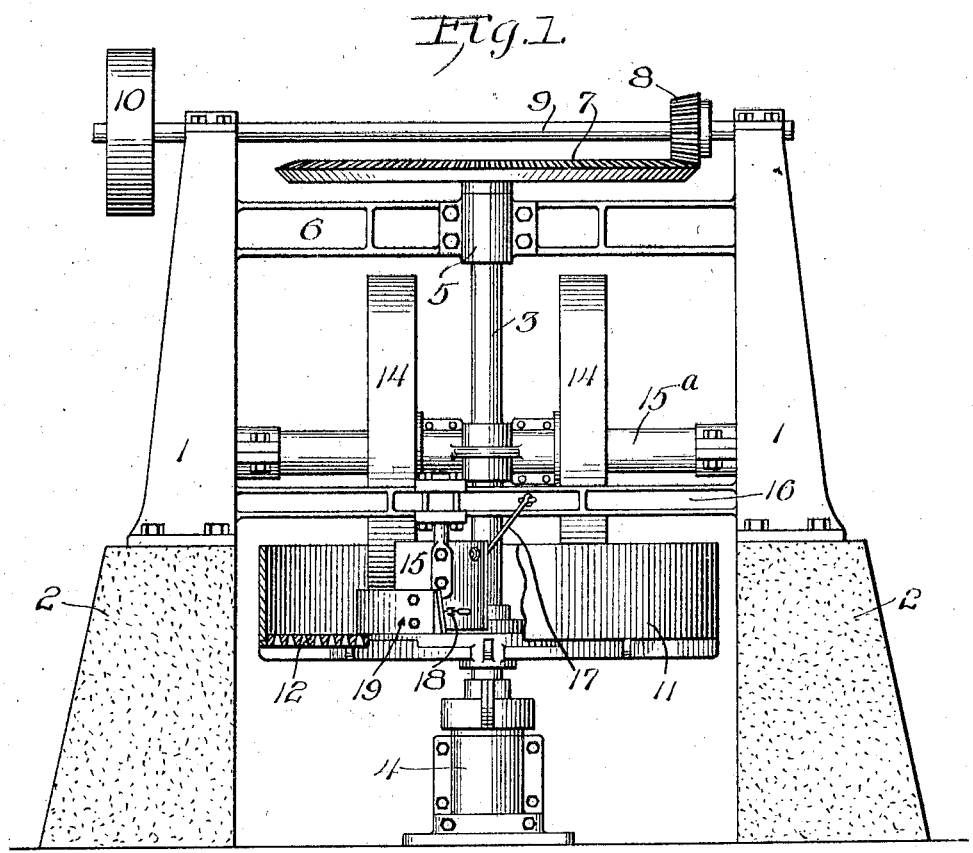
Fig. 1 is a side elevational view of a "dry pan" machine with parts broken away.

Referring to the drawings, the "dry pan" machine is of a common type, the frame 1 being mounted upon base portions 2 and having the vertical rotatable shaft 3 supported by a lower bearing 4 and an upper bearing 5 in the transverse brace 6. At the upper extremity of the shaft is a large beveled gear 7 meshing with a gear 8 mounted upon the shaft 9 which is driven from a pulley 10 forming a source of power not shown. The pan 11 in which the material to be ground is placed is fixedly mounted upon the vertical shaft and has positioned in the bottom thereof a plurality of removable grates such as that shown at 12 in Fig. 2. Centrally of the pan is a wearing board or plate 13 which is contacted by the heavy grinding or muller wheels 14 rotably mounted upon the shaft 15ª. These wheels are of heavy construction having hardened steel rims for pulverizing such materials as shale, clay, fire brick, fire-proofing ingredients, and innumerable hard materials, including clays and silicates used in connection with the ceramic arts.

The functioning of the machine is as follows: The materials to be ground are pulverized, are placed in the pan and the pan rotated by means of the shaft 3 through the drive explained. The material traveling with the pan is directed beneath the muller or grinding wheels by means of stationary plows 15 which feed the material thrown to the outer portion of the pan toward the center of the pan and beneath the muller wheel. These plows are rigidly affixed to the transverse beams 16 and strut rods 17. It will be noted that there are two plows positioned diametrically opposite each other in the pan and having their outer ends substantially contacting the inner surface of the pan while their inner ends are in a position whereby the material passing diagonally along the plow from the outer portion of the pan will be directed beneath the muller wheels and the wearing board.

Heretofore considerable difficulty has been encountered in the clogging of the grates or screen plates, especially with wet material, as the pulverized substances tend to collect in the slots of the plates and prevent the ground material from passing through. Also larger pieces become lodged in the plates preventing the ground substances from sifting through the screen.

It will be readily appreciated that the plows 15 which are rigidly attached to the beams 16 cannot be positioned in contacting relation with the lower screens nor have their outer scraping ends contacting the inner surface of the pan, due to the fact that any slight unevenness in the pan's rotation or clogging of hard pieces in the screens would break the machine or screen plates during operation. When, however, there is space left between the bottom screens and the plows or between the plows and the inner surface of the pan, it is difficult to prevent the collection of material which in time accumulates and prevents efficient operation. To facilitate the clearing of the pan and the grates or screen plates, I have attached to the rear of the plow, by means of a chain hitch 18, an automatic device which comprises a substantially floating scraper or shear shown at 19. This scraper not only increases the capacity of the "dry pan" or chasing mill by keeping the screen plates clean and open at all times, but also makes for more efficient operation by removing the material which tends to accumulate on both the screen plates and upon the inner wall of the circular pan.

The construction of this shear, shown more in detail in Fig. 3, comprises a scraper portion 19ª and a shaped tail piece 19ᵇ. The chain hitch, by means of which the scraper is attached to the plow, may be affixed by clevices, eyes, hooks, or other means of attachment which may be easily detached should it be desired to remove the shear from the pan. The shear is preferably of steel construction to withstand the rough usage to which it will be subjected during the rotation of the pan.

The functioning of the device is obvious from its position in the pan, as it takes the form of a substantially floating plow which rides on the screen plates and due to the position of the chain hitch connection, has the nose of the scraper portion held substantially at all times in contact with the wall of the pan. Thus any material collecting on the wall of the pan or clogging the plates will be acted upon by the shear. In operation it has been found that by attaching a floating scraper of this character so as to contact both the lower screen plates and the inner wall of the pan it is possible to eliminate to a great extent the clogging and accumulation of material both on the screen plates and on the inner wall of the pan. The shear, due to the fact that it is not rigidly connected to the mechanism, rides over the material, at the same time loosening the clogging material and removing larger pieces that have become jammed in the grates.

The device is easily installed in any type machine and while relatively simple is efficient in operation. Also numerous variations may be made of this particular mechanism in the shape and character of construction without departing from the spirit of the invention.

I claim as my invention:

1. In a grinding mill, the combination with a rotating pan having a wearing surface and a grated bottom, of grinding members coacting with the wearing surface to grind materials, stationary members adapted to push the materials beneath the grinding members with the rotation of the pan, plow-shaped scraping means floating on the grates, chain hitch connections between the scrapers and the stationary members.

2. In a dry pan the combination with a rotating pan having a wearing surface and a grated bottom, of grinding members coacting with the wearing surface to grind the material, stationary members adapted to push the material beneath the grinding members with the rotation of the pan, scraping means flexibly attached to the stationary members and loosely bearing upon the grates and side wall of the pan to prevent the collection and accumulation of obstructive material.

3. In a dry pan the combination with a rotating pan having a wearing surface and a grated bottom, of grinding members coacting with the wearing surface to grind the material, stationary members adapted to push the material beneath the grinding members with the rotation of the pan, wedge shaped scrapers having flexible attachments at their sharpened ends to stationary portions of the mechanism and positioned to freely ride upon the grates of the pan and contacting the inner wall of the pan preventing the collection and accumulation of obstructive material.

4. In a dry pan the combination with a rotating pan having a wearing surface and grated bottom, of grinding members coacting with the wearing surface to grind the material, scraping means flexibly attached to the stationary portion of the machine and loosely bearing upon the grates and side walls of the pan to prevent the collection and accumulation of obstructive material.

THOMAS E. BURNER.